(12) United States Patent
Barsness et al.

(10) Patent No.: US 10,379,806 B2
(45) Date of Patent: Aug. 13, 2019

(54) DYNAMIC SELECTION FOR TOUCH SENSOR

(71) Applicant: International Business Machines Corporation, Armonk, NY (US)

(72) Inventors: Eric L. Barsness, Pine Island, MN (US); Jay S. Bryant, Rochester, MN (US); James E. Carey, Rochester, MN (US); Joseph W. Cropper, Rochester, MN (US); John M. Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 217 days.

(21) Appl. No.: 15/344,189

(22) Filed: Nov. 4, 2016

(65) Prior Publication Data

US 2018/0129398 A1    May 10, 2018

(51) Int. Cl.
*G06F 3/0484* (2013.01)
*G06F 3/044* (2006.01)
*G06F 3/041* (2006.01)
*G06F 3/16* (2006.01)
*G06F 3/0488* (2013.01)

(52) U.S. Cl.
CPC ............ *G06F 3/165* (2013.01); *G06F 3/0416* (2013.01); *G06F 3/0488* (2013.01); *G06F 2203/04806* (2013.01)

(58) Field of Classification Search
CPC .... G06F 3/04842; G06F 3/044; G06F 3/0416; G06F 3/165; G06F 3/4083; G06F 3/04845; G06F 2203/04108; G06F 2203/04105
See application file for complete search history.

(56) References Cited

U.S. PATENT DOCUMENTS

| | | | |
|---|---|---|---|
| 8,279,189 B2 | 10/2012 | Yilmaz | |
| 8,769,443 B2 | 7/2014 | King et al. | |
| 9,046,999 B1* | 6/2015 | Teller | G02B 27/017 |
| 2008/0088602 A1 | 4/2008 | Hotelling | |
| 2010/0039393 A1 | 2/2010 | Pratt et al. | |
| 2011/0057899 A1* | 3/2011 | Sleeman | G01L 1/146 |
| | | | 345/174 |
| 2011/0102336 A1 | 5/2011 | Seok et al. | |

(Continued)

FOREIGN PATENT DOCUMENTS

EP    2141574 A2    1/2010

OTHER PUBLICATIONS

Tsuji et al., "A Layered 3D Touch Screen Using Capacitance Measurement," IEEE Sensors Journal, vol. 14, No. 9, Sep. 2014, pp. 3040-3045.

(Continued)

*Primary Examiner* — Shourjo Dasgupta
(74) *Attorney, Agent, or Firm* — Daniel C. Housley (57) ABSTRACT

A system and method for modifying a feature of a device based on an applied touch intensity is disclosed. When a touch is received, a sensor component sends a signal to a measurement component. The measurement component converts the signal into a touch intensity and provides the determined touch intensity to a selection component. The selection component selects at least one action from a set of actions to be executed by the device based on the determined touch intensity.

14 Claims, 6 Drawing Sheets

(56) References Cited

U.S. PATENT DOCUMENTS

| | | | |
|---|---|---|---|
| 2011/0239110 A1* | 9/2011 | Garrett | G06F 3/0488 |
| | | | 715/256 |
| 2012/0256839 A1* | 10/2012 | Suggs | G06F 3/0202 |
| | | | 345/168 |
| 2013/0257769 A1* | 10/2013 | Sheik-Nainar | G06F 3/0488 |
| | | | 345/173 |
| 2014/0002374 A1* | 1/2014 | Hunt | G06F 3/0488 |
| | | | 345/173 |
| 2014/0340358 A1 | 11/2014 | Martinoli | |
| 2015/0043748 A1* | 2/2015 | Sudo | H04R 17/00 |
| | | | 381/102 |
| 2015/0186005 A1* | 7/2015 | Roper | G06F 3/0488 |
| | | | 715/765 |
| 2015/0253918 A1 | 9/2015 | Algreatly | |
| 2015/0261330 A1 | 9/2015 | Jalali | |
| 2016/0188181 A1* | 6/2016 | Smith | G06F 1/146 |
| | | | 345/174 |
| 2017/0123550 A1* | 5/2017 | Lee | G06F 3/04883 |
| 2018/0107356 A1* | 4/2018 | Clarke | H04S 7/301 |

OTHER PUBLICATIONS

Mell et al., "The NIST Definition of Cloud Computing," Recommendations of the National Institute of Standards and Technology, Special Publication 800-145, Sep. 2011, 7 pages, National Institute of Standards and Technology, Gaithersburg, MD.

* cited by examiner

DYNAMIC SELECTION FOR TOUCH SENSOR

BACKGROUND

The present disclosure is related to dynamic touch sensors. Touch sensitive or touch devices, such as smart phones, navigation devices, tablet computers, e-readers, music players, smart watches, and other devices, have become commonplace in today's society. Accordingly, users are performing more tasks with these devices and the tasks are becoming more complicated. However, as the level of tasks has become more complicated, the way touch is interpreted by a device has not changed. Thus, a touch on the device only means one thing.

SUMMARY

The following presents a simplified summary of the disclosure in order to provide a basic understanding to the reader. This summary is not an extensive overview of the disclosure and it does not necessarily identify key features or essential features of the invention, nor does it delineate the scope of the invention. Its sole purpose is to present some concepts disclosed herein in a simplified form as a prelude to the more detailed description that is presented later.

The present disclosure provides a system and method for detecting dynamic touch and performing an action selected from a variety of actions based on the intensity of that touch.

In one embodiment, the device is configured to detect a touch. When a touch is received, the sensor component of the device sends a signal to the measurement component. The signal is indicative of the intensity of the touch. The measurement component converts the signal into a touch intensity and provides the determined touch intensity to the selection component. The selection component selects an action from the set of actions, based on the determined touch intensity. The selected action is executed by the device.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Figure 1A:
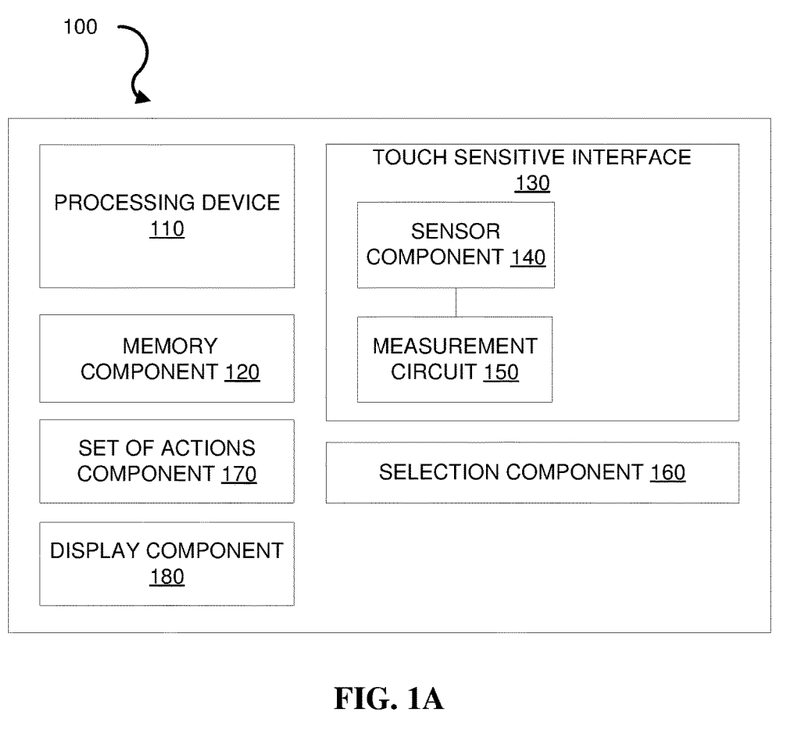
FIG. 1A is a block diagram illustration of a device with a touch sensitive interface.

FIG. 1A is a block diagram illustrating a touch sensitive device 100, according to one illustrative embodiment. Device 100 can be a portable device such as a smart phone, a global positioning system (GPS) navigation device, a tablet computer, a mobile computer, a wearable device, a home automation device, or any other device that is sensitive to touch. However, in other embodiments, the device 100 is a stationary device, for example, a copy machine, a sensor locking interface for opening a car, or building door. Device 100 includes a processor 110, a memory 120, a touch sensitive interface 130, a sensor component 140, a measurement component 150, and a selection component 160.

The processor 110 is a component of the device 100 that allows for the execution and/or performance of the features of the device 100. The processor 110 can be a central processing unit (CPU), a processor, a co-processor, a processor with at least one core, and/or any other device that can operate as a processor. In some embodiments, the device 100 includes more than one processor 110. When multiple processors are present, the processors can be the same type of processor or different types of processors.

Memory 120 is a component of the device 100 that stores information and/or data. The memory 120 can be various types of memory such as RAM, ROM, cache, virtual memory, flash memory, or any other component capable of performing actions of memory or storage. The memory 120 can include volatile or nonvolatile memory, or a combination thereof. Device 100 can have more than one type of memory.

Touch sensitive interface 130 is a component of the device 100 that is configured to detect a touch. A touch can be an applied pressure, a force, a capacitive change, an interference pattern, and/or any change caused by a user to a touch sensitive interface. In some embodiments the touch is a contact touch. In some embodiments the touch is a capacitive touch. Any object can be used to apply a touch to activate the touch sensitive interface 130 such as a finger, a stylus, a forearm, a foot, a pencil, etc. The touch sensitive interface 130 can be any device or interface capable of detecting a touch, for example, a touch sensitive screen, a pressure sensor, one or more capacitive touch sensors, one or more resistive touch sensors, etc. The touch sensitive interface 130 can, in some embodiments, be configured to detect changes in the touch intensity.

In some embodiments, the touch sensitive interface 130 is sensitive to a proximity contact. A proximity contact is a contact that is not an actual physical contact with the interface. For example, a finger in close proximity to the touch sensitive interface 130 can cause a sensor to register a change in capacitance without the finger physically contacting the touch sensitive interface 130. The touch sensitive interface 130 then reacts as if an actual contact has been made. However, other methods for detecting the touch can be used.

In some embodiments, the touch sensitive interface 130 is configured to detect a plurality of points of contact, e.g., where two or more touch locations are detected. Additionally, the multiple points of contact may move over time. For example, a "zoom in" gesture can be indicated by a thumb and forefinger first contacting the device 100. Then while maintaining contact with the device 100, the thumb and forefinger sliding away from each other. Another example can be a "scroll" or "swipe" gesture that includes a finger coming into contact with the touch screen, and then the finger sliding across the screen while maintaining contact with the device screen. The speed of the scrolling can be augmented by the pressure applied, while applying the motion to the screen. In some embodiments, a gesture that requires two points of contact can be augmented with a variable touch intensity. For example, two fingers can be used to apply variable touch intensity in combination with a touch gesture to augment the gesture (e.g., where two fingers sliding apart is a touch gesture that denotes a zoom action to the touch sensitive interface, the combination of increasing touch intensity, plus the gesture, increases the rate of the action, in this case, zoom.). Therefore, any gesture can be augmented with the combination of that gesture and a variable touch intensity.

Sensor component 140 is the component of the device 100 that determines if a touch has been received by the touch sensitive interface 130. The sensor component can also determine the position of a touch and the change in a touch. In some embodiments, the sensor component 140 is a component of the touch sensitive interface 130. The sensor component 140 is coupled to the measurement circuit 150. In some embodiments, the sensor component 140 has a plurality of sensing areas.

Figure 1B:
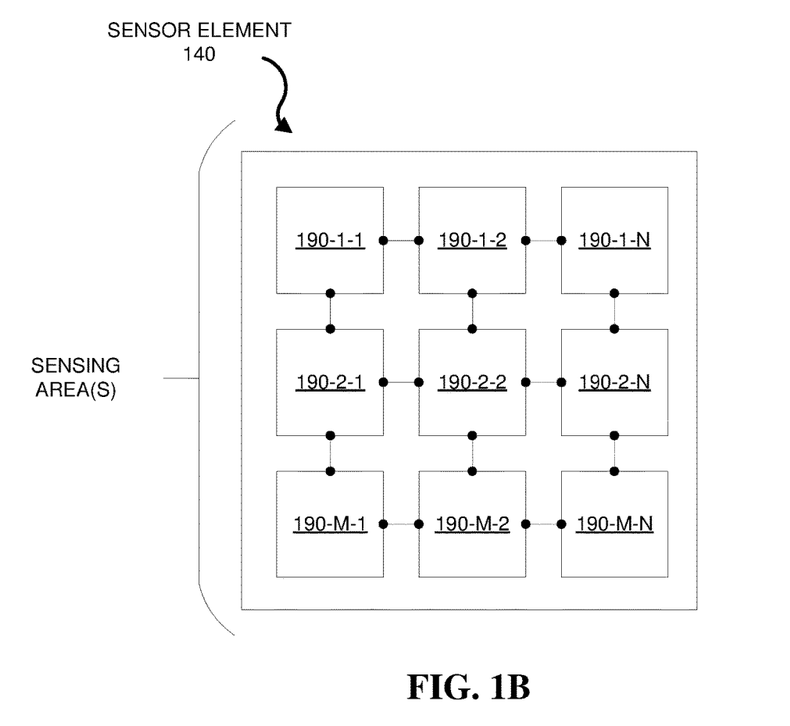
FIG. 1B is a block diagram illustration of a sensor component with an array of sensing areas.

FIG. 1B is a block diagram illustrating an exemplary sensor component 140, according to one embodiment, with an array of sensing areas. FIG. 1B illustrates nine sensors in the sensor component 140. However, it should be noted that the sensor areas can have any number of sensors arranged in any manner. The arrangement, and the number of which, is based upon the design and use of the corresponding device. In other embodiments the sensing area can be a single sensor. In some embodiments when the sensor component is an array of sensing areas, this sensor array can be configured to determine the position of a touch, as well as detect the touch itself. In other embodiments, the sensor component can only detect a touch, and may not be configured to determine the position of a touch.

As any number of sensors can be present in the sensing array in FIG. 1B, the sensing areas are represented as sensors 190-1-1, 190-1-2, 190-1-N, 190-2-1, 190-2-2, 190-2-N, 190-M-1, 190-M-2, and 190-M-N (collectively referred to as sensor 190). The sensing areas can make up a contiguous sensor element or sensing array. The sensing array can be configured to determine a gesture denoted by a touch configuration.

Referring back to FIG. 1A, the measurement component 150 is a component of the device 100 that is configured to determine the intensity of the touch applied to the touch sensitive interface 130, and can, in some embodiments, measure change in the intensity applied to the touch sensitive interface 130. In some embodiments this measurement is a quantitative measurement. In other embodiments this measurement is a qualitative measurement, e.g., the presence of a touch. Further the amount of force or load applied and measured can be a change in the touch intensity. As a result of the measured force, a corresponding change in an associated action can occur. This change can, for example, depending on the measured change, result in a change in a selection area, an increase/decrease in a volume, brightness or a zoom, or any other adjustable feature of the device 100. In some embodiments the measurement circuit 150 is coupled to the sensor component 140. In some embodiments, the coupling of the measurement circuit 150 to the sensor component 140 is electrical coupling. In some embodiments, the touch intensity is a touch duration, for example, a touch maintained for a threshold period of time.

For example, when a touch is detected by the device, the measurement component 150 can be configured to respond to that touch by measuring the touch or change in the touch intensity, and the selection component 160 can then be configured to respond to that measurement by selecting actions based on measurements from the measurement component 150. In one illustrative example, the measurement component 150 receives a signal from the touch sensitive interface 130 when a touch is detected by the touch sensitive interface 130. The signal is indicative of the intensity of the touch. The measurement component 150 converts the signal into a touch intensity, and provides the determined touch intensity to the selection component 160.

The selection component 160 is a component of the device 100 that is configured to select an action from a set of actions 170 based upon the determined touch intensity. For example, an action can be the selection of a word, a phrase, a sentence, a paragraph, etc. The selection component 160 can be configured to identify any number of threshold values, and to select an action from the set of actions 170 based on the touch intensity.

In some embodiments, the selection component 160 can determine that a change in the touch intensity is a reduction in the already applied touch intensity. In this approach the device can reverse a selection or move to a section that corresponds to the newly applied touch intensity. However the device can use different threshold values for making this decision to account for various impacts to the sensor and human reactions.

The selection component 160 can be configured to respond to a detected change in touch intensity, where if the applied touch intensity is reduced below the threshold value required for a selected action, the selection is canceled and another action is selected. The selection component 160 can be configured to respond to a detected change where if the applied touch intensity is maintained at or above the threshold value required for the selected action, the selected action is maintained. The selection component 160 can be configured to respond to a detected change where if the applied touch intensity is maintained or increased to at least the threshold value required for the selection of a different action, the different action selection is maintained. The selection component 160 can be configured to respond to a detected change where if the touch intensity is reduced below the threshold value required for the different action selection, the different action is unselected and the originally selected action is selected.

The device can be configured to determine if the touch intensity of an already applied touch has changed. This change can either be an increase or a decrease in the touch intensity. The selection component 160 determines if the change in the touch intensity falls above or below a threshold value that would cause a preexisting selection to change. For example, if the intensity were reduced below a threshold value to maintain the currently selected action, the selection component 160 can select the corresponding action from the set of actions 170 that would have been selected prior to the currently selected action (e.g., reducing the selection from a paragraph to a sentence). Conversely, if the intensity were increased above a threshold value to maintain the currently selected action, the selection component 160 can select the corresponding action from the set of actions 170 that would have been selected after the currently selected action (e.g. increasing the selection from a sentence to a paragraph). It should be noted that the threshold values used when a decreasing intensity is determined, may not be the same threshold values for the intensity used when the intensity is determined to be increasing. Further, in some embodiments, different threshold values are used when determining an initial selection and when changing that selection. While it is discussed herein with respect to the touch intensity increasing or decreasing, causing the selection of a later or prior action, it should be noted that depending on the determined intensity and the corresponding threshold values, the selection may skip an action in the set of actions to select a different action (e.g. the reduction of the intensity is such that the selection is reduced from a paragraph to a word, skipping the selection of a sentence).

As discussed above, the selection component 160 selects an action from the set of actions 170 based on the determined touch intensity. The set of actions 170 are a set of instructions that include a plurality of actions that can be selected and executed based upon input received by the device 100. Each action in the set of actions can have a threshold value associated with it, the threshold value is representative of the touch intensity required for that action to be selected. In some embodiments, each action in the set of actions may have more than one threshold value, for example, an action can have a first threshold value for selection of the action, and the same action can have a different threshold value for de-selection of the action. In one embodiment, the set of actions 170 includes any action for selecting a portion of text. In another embodiment, the set of actions 170 includes any action for selecting a larger portion of text. For example, selecting a portion of text may include: positioning of a cursor, the selection of a letter or character in a word, the selection of a word, the selection of a sentence, phrase, or string of words, the selection of a paragraph, or the selection of a page, etc. In other embodiments, the set of actions 170 includes instructions to adjust any feature of a system, such as selection of text, intensity of sound, brightness level, and magnification of content displayed, etc. Further, the set of actions may include instructions to perform more than one action at a time.

In one embodiment, the set of actions includes any action for selecting a volume level, or an intensity of sound. For example, various preset volume levels can be configured for various threshold values (e.g., if a touch intensity is determined to increase, the volume level can be configured to increase. Conversely, if the touch intensity is determined to decrease, the volume level can be configured to decrease).

In another embodiments the set of actions 170 includes any action for selecting a zoom level (e.g., a change in the magnification of content displayed.) For example, various preset zoom levels can be configured for various threshold values (e.g., if a touch intensity is determined to increase, the zoom level can be configured to increase. Conversely, if the touch intensity is determined to decrease, the zoom level can be configured to decrease).

In another embodiments the set of actions 170 includes any action for selecting a brightness level. For example, various preset brightness levels can be configured for various threshold values (e.g., if a touch intensity is determined to increase, the brightness level can be configured to increase. Conversely, if the touch intensity is determined to decrease, the brightness level can be configured to decrease).

The touch sensitive interface 130 can be part of a display 180. Examples of displays include: an LCD monitor, a CRT monitor, or any other component that is capable of displaying information to a user. The display 180 is an optional component of the device 100 that is configured to display information or content to a user. For example, the display can present icons and text that can be visualized on a device screen and can be selected with touch. In some embodiments, the touch sensitive interface 130 is part of the display 180. In some embodiments, the display is separate from the device.

Figure 2:
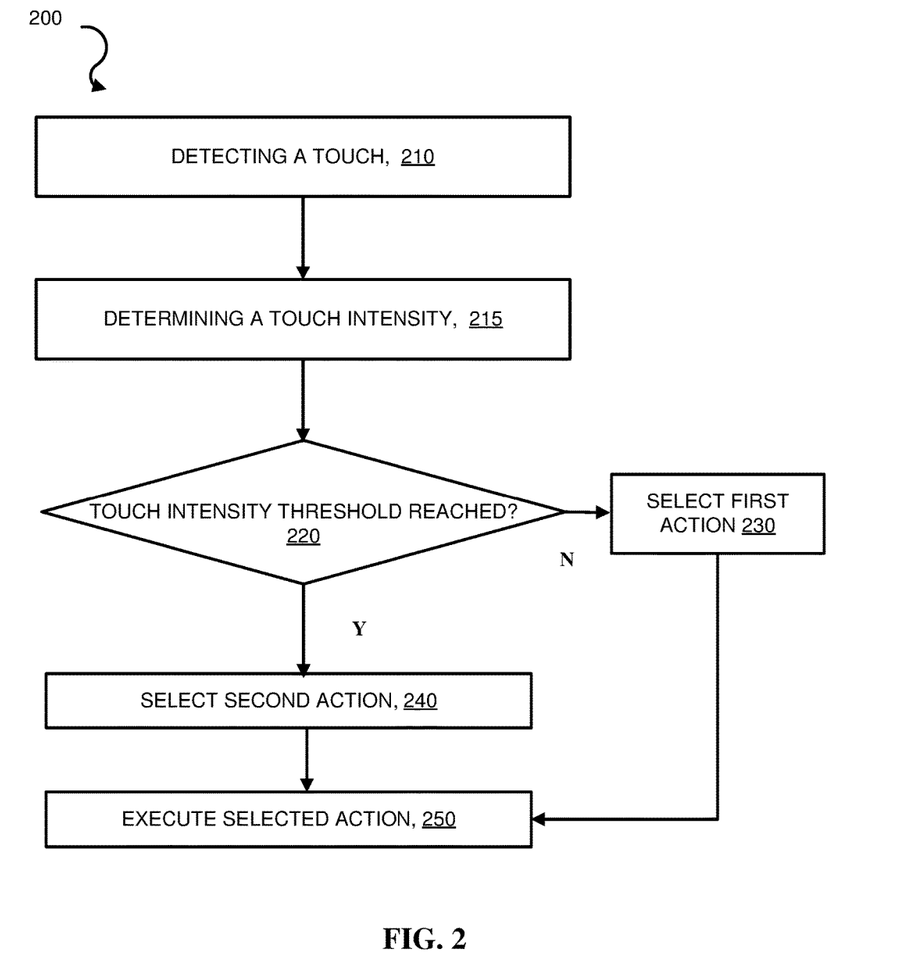
FIG. 2 is a block diagram illustration of a process for interacting with a device having a touch sensitive interface.

FIG. 2 is a flow diagram illustrating a process 200 for selecting an action from a set of actions based upon a detected touch. Process 200 begins by detecting a touch. This is illustrated at step 210. At this step a touch to a touch sensitive interface 130 is detected. The touch can be an actual or a proximity touch. For example, a proximity touch can be a finger brought into close enough proximity to a capacitive touchscreen to cause a measurable change in capacitance where the device is configured to infer the presence of a touch based on that change. In some embodiments, the touch can be an initial touch. In other embodiments, the touch can be a change in the touch intensity of an already applied touch.

Following the detection of the touch, the touch intensity is determined. This is illustrated at step 215. This touch intensity can be represented as a value. The measurement component 150 receives a signal indicative of the touch intensity, and the measurement component 150 then calculates a value of the touch intensity based on this received signal the magnitude or intensity of the applied touch.

Following the determination of the touch intensity, a determination of whether a threshold value has been met is made. This is illustrated at step 220. At this step the selection component 160 receives the value of the touch intensity from the measurement component 150. This touch intensity is then compared to the threshold value for selecting a particular action. A determination is then made as to whether a threshold value is met. In some embodiments, if a change in an already applied force is detected, the change in the touch intensity is compared to a threshold value, and then a determination is made of whether or not a threshold value is met. In some embodiments, the threshold value is considered met if the touch intensity meets or exceeds a threshold value. In other embodiments, the threshold value is considered met only if the touch intensity applied meets the threshold value. In still other embodiments, the threshold value is considered met, if the touch intensity does not exceed the threshold value. The touch can initially meet or exceed the threshold value but later drop below the threshold value. The threshold value can be considered met if the touch intensity is initially less than the threshold value but it can later be determined that the touch intensity has changed to later exceed the threshold value.

If it is determined that a threshold value has not been met, then a first action from a set of actions is selected. This is illustrated at step 230. The set of actions can be the set of actions 170 of the device 100. A plurality of threshold values can be identified by the process 200 to correspond to a plurality of different actions, which allows the selection of distinct actions based on specifically assigned threshold values. In some embodiments, the first action is no action (e.g., selects nothing). In some embodiments, the first action is a currently selected action. In some embodiments, the first action is selecting a portion of text. In some embodiments the second action is selecting a larger portion of text. For example, a word is a larger portion of text than a letter or character, a sentence is a larger portion of text than a word, a paragraph is a larger portion of text than a sentence, etc. In some embodiments when the detected touch is determined to be increasing in intensity, the second action is selecting a greater portion of text than what was selected by the first action. In some embodiments when the detected touch is determined to be decreasing in intensity the second action is selecting a lesser portion of text than what was selected by the first action.

If it is determined that the threshold value has been met or exceeded, then a second different action from the set of actions 170 is selected. This is illustrated at step 240. If the touch intensity that is required for the selection of the second action is decreased below the threshold value required for the selection of that second action, then the first action is selected. However, the threshold value for selecting the first action from the second action can be different than the threshold value required for initially selecting the second action.

After the action is selected the selected action is executed. This is illustrated at step 250. The execution of the selected action from the set of actions 170 may result in the display 180 displaying the selection of text (e.g., a letter, a word, a sentence, etc.). In some embodiments, the process can be configured to include a time delay before the execution of the selected action. After the selected action has been executed, the process can be repeated. This allows a user to continue executing further actions as desired by the user. Such further actions can include positioning the cursor, or selecting text, etc.

Figure 3:
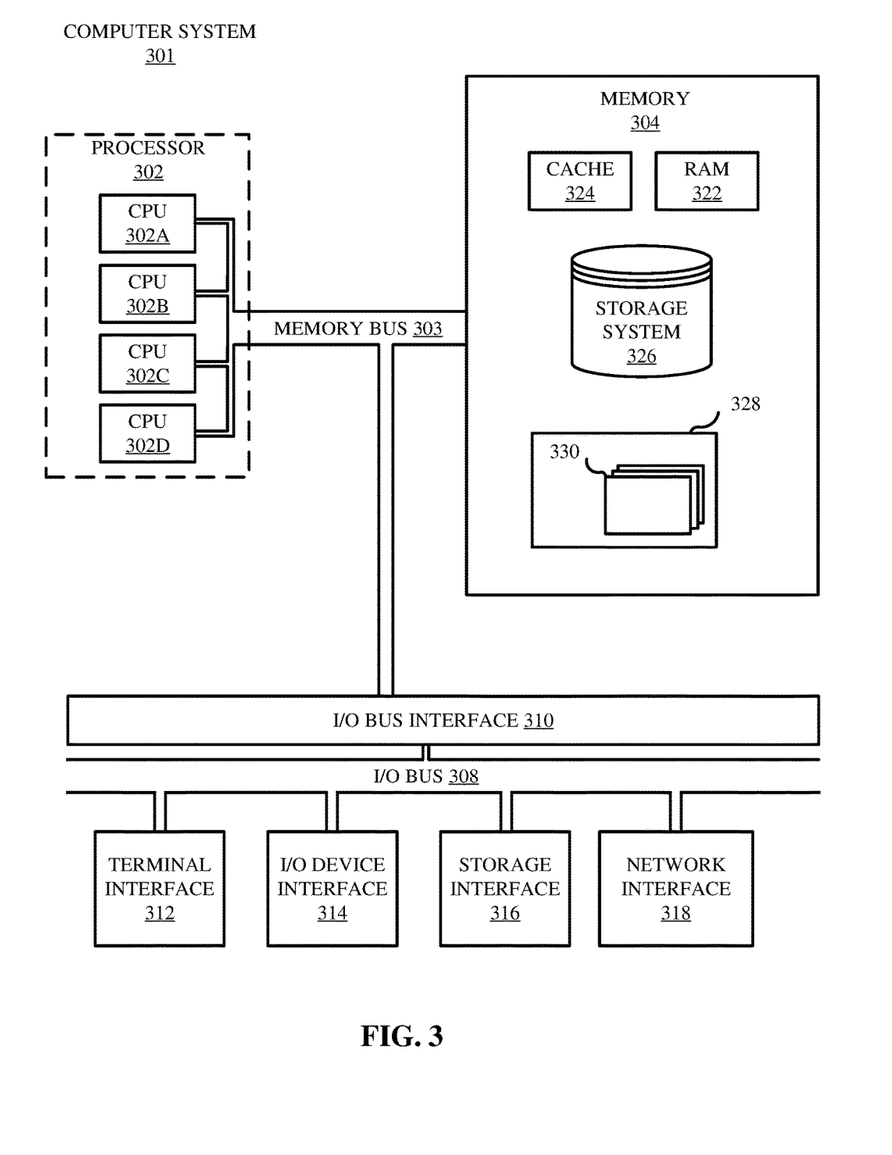
FIG. 3 is a block diagram illustration of a computer system.

Referring now to FIG. 3, shown is a high-level block diagram of an example computer system 301 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 301 may comprise one or more CPUs 302, a memory subsystem 304, a terminal interface 312, a storage interface 316, an I/O (Input/Output) device interface 314, and a network interface 318, all of which may be communicatively coupled, directly or indirectly, for inter-component communication via a memory bus 303, an I/O bus 308, and an I/O bus interface unit 310.

The computer system 301 may contain one or more general-purpose programmable central processing units (CPUs) 302A, 302B, 302C, and 302D, herein generically referred to as the CPU 302. In some embodiments, the computer system 301 may contain multiple processors typical of a relatively large system; however, in other embodiments the computer system 301 may alternatively be a single CPU system. Each CPU 302 may execute instructions stored in the memory subsystem 304 and may include one or more levels of on-board cache.

System memory 304 may include computer system readable media in the form of volatile memory, such as random access memory (RAM) 322 or cache memory 324. Computer system 301 may further include other removable/non-removable, volatile/non-volatile computer system storage media. By way of example only, storage system 326 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 304 can include flash memory, e.g., a flash memory stick drive or a flash drive. Memory devices can be connected to memory bus 303 by one or more data media interfaces. The memory 304 may include at least one program product having a set (e.g., at least one) of program modules that are configured to carry out the functions of various embodiments.

Although the memory bus 303 is shown in FIG. 3 as a single bus structure providing a direct communication path among the CPUs 302, the memory subsystem 304, and the I/O bus interface 310, the memory bus 303 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 310 and the I/O bus 308 are shown as single units, the computer system 301 may, in some embodiments, contain multiple I/O bus interface units 310, multiple I/O buses 308, or both. Further, while multiple I/O interface units are shown, which separate the I/O bus 308 from various communications paths running to the various I/O devices, in other embodiments some or all of the I/O devices may be connected directly to one or more system I/O buses.

In some embodiments, the computer system 301 may be a multi-user mainframe computer system, a single-user system, or a server computer or similar device that has little or no direct user interface, but receives requests from other computer systems (clients). Further, in some embodiments, the computer system 301 may be implemented as a desktop computer, portable computer, laptop or notebook computer, tablet computer, pocket computer, telephone, smart phone, network switches or routers, or any other appropriate type of electronic device.

It is noted that FIG. 3 is intended to depict the representative major components of an exemplary computer system 301. In some embodiments, however, individual components may have greater or lesser complexity than as represented in FIG. 3, components other than or in addition to those shown in FIG. 3 may be present, and the number, type, and configuration of such components may vary.

One or more programs/utilities 328, each having at least one set of program modules 330 may be stored in memory 304. The programs/utilities 328 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 328 and/or program modules 330 generally perform the functions or methodologies of various embodiments.

In some embodiments, the modules 330 may include instructions that perform the steps of the process 200 shown in FIG. 2.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
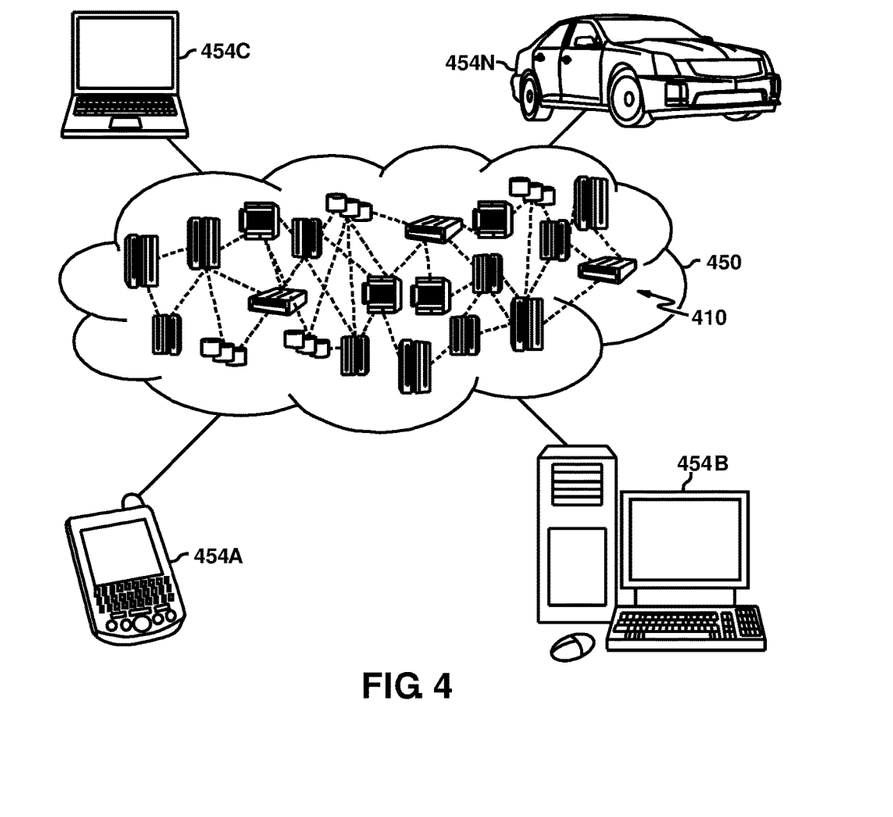
FIG. 4 depicts a cloud computing environment according to an embodiment of the present invention.

Referring now to FIG. 4, illustrative cloud computing environment 450 is depicted. As shown, cloud computing environment 450 includes one or more cloud computing nodes 410 with which local computing devices used by cloud consumers, such as, for example, personal digital assistant (PDA) or cellular telephone 454A, desktop computer 454B, laptop computer 454C, and/or automobile computer system 454N may communicate. Nodes 410 may communicate with one another. They may be grouped (not shown) physically or virtually, in one or more networks, such as Private, Community, Public, or Hybrid clouds as described hereinabove, or a combination thereof. This allows cloud computing environment 450 to offer infrastructure, platforms and/or software as services for which a cloud consumer does not need to maintain resources on a local computing device. It is understood that the types of computing devices 454A-N shown in FIG. 4 are intended to be illustrative only and that computing nodes 410 and cloud computing environment 450 can communicate with any type of computerized device over any type of network and/or network addressable connection (e.g., using a web browser).

Figure 5:
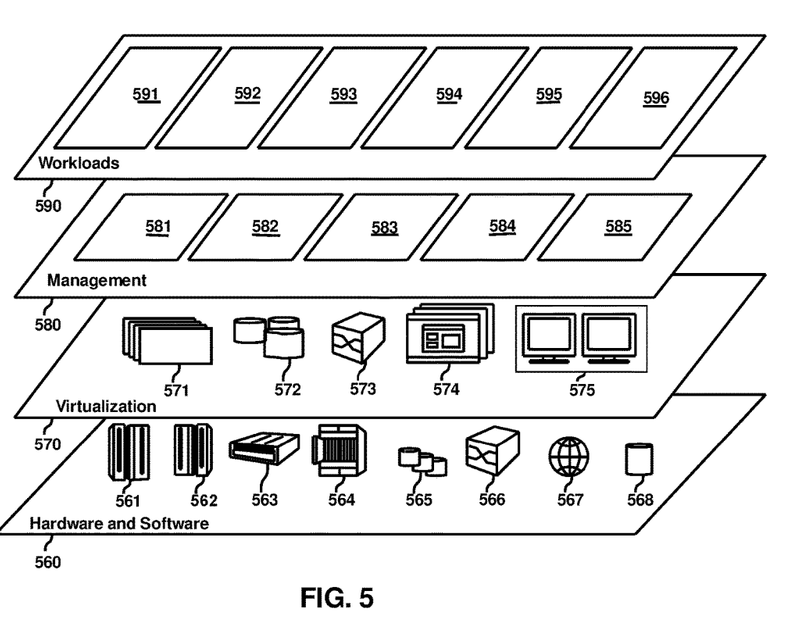
FIG. 5 depicts abstraction model layers according to an embodiment of the present invention.

Referring now to FIG. 5, a set of functional abstraction layers provided by cloud computing environment 450 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 560 includes hardware and software components. Examples of hardware components include: mainframes 561; RISC (Reduced Instruction Set Computer) architecture based servers 562; servers 563; blade servers 564; storage devices 565; and networks and networking components 566. In some embodiments, software components include network application server software 567 and database software 568.

Virtualization layer 570 provides an abstraction layer from which the following examples of virtual entities may be provided: virtual servers 571; virtual storage 572; virtual networks 573, including virtual private networks; virtual applications and operating systems 574; and virtual clients 575.

In one example, management layer 580 may provide the functions described below. Resource provisioning 581 provides dynamic procurement of computing resources and other resources that are utilized to perform tasks within the cloud computing environment. Metering and Pricing 582 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 583 provides access to the cloud computing environment for consumers and system administrators. Service level management 584 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 590 provides examples of functionality for which the cloud computing environment may be utilized. Examples of workloads and functions which may be provided from this layer include: mapping and navigation 591; software development and lifecycle management 592; virtual classroom education delivery 593; data analytics processing 594; transaction processing 595; and selection of action 596.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present invention has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method for interacting with a device having a touch sensitive interface, the method comprising:
   detecting a touch at the touch sensitive interface;
   determining the touch intensity of the touch;
   determining if the detected touch intensity exceeds a threshold value;
   selecting a first action from a set of actions when the touch intensity is determined not to exceed the threshold value, wherein the first action is selecting of a portion of text;
   selecting a second action from the set of actions when the touch intensity is determined to exceed the threshold value, the second action being different than the first action, wherein the second action is selecting a lesser portion of text than the first action.

2. The method of claim 1, wherein the second action is selecting a larger portion of text than the first action.

3. The method of claim 1, wherein the second action is selecting a page.

4. The method of claim 1, wherein the second action is selecting a paragraph.

5. The method of claim 1, wherein the second action is selecting a sentence.

6. The method of claim 1, wherein the second action is selecting a word.

7. The method of claim 1, wherein the first action is selecting a page.

8. The method of claim 1, wherein the first action is selecting a paragraph.

9. The method of claim 1, wherein the first action is selecting a sentence.

10. The method of claim 1, wherein the first action is selecting a word.

11. The method of claim 1, wherein the second action further includes a change in a magnification of the selected text.

12. The method of claim 1, wherein the second action further includes a change in an intensity of sound.

13. The method of claim 1, wherein the touch comprises a contact touch.

14. The method of claim 1, wherein the touch comprises a capacitive touch.

\* \* \* \* \*